(12) United States Patent
Oogami et al.

(10) Patent No.: US 10,277,801 B2
(45) Date of Patent: Apr. 30, 2019

(54) IMAGE CAPTURE DEVICE

(71) Applicant: Panasonic Intellectual Property Management Co., Ltd., Osaka (JP)

(72) Inventors: Tomohiro Oogami, Nara (JP); Mitsuyoshi Okamoto, Osaka (JP); Kohei Fukugawa, Osaka (JP); Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/869,791

(22) Filed: Jan. 12, 2018

(65) Prior Publication Data
US 2018/0139380 A1 May 17, 2018

Related U.S. Application Data

(63) Continuation of application No. PCT/JP2016/004413, filed on Sep. 30, 2016.

(30) Foreign Application Priority Data

Oct. 6, 2015 (JP) .................. 2015-198146

(51) Int. Cl.
   *H04N 5/232* (2006.01)
   *G02B 7/36* (2006.01)
   *G03B 13/36* (2006.01)
   *H04N 5/235* (2006.01)
   *G02B 7/38* (2006.01)

(52) U.S. Cl.
   CPC ........... *H04N 5/23212* (2013.01); *G02B 7/36* (2013.01); *G02B 7/38* (2013.01); *G03B 13/36* (2013.01); *H04N 5/232* (2013.01); *H04N 5/2356* (2013.01); *H04N 5/23216* (2013.01)

(58) Field of Classification Search
   CPC .. H04N 5/23212; H04N 5/225; H04N 5/2356; H04N 5/23216; H04N 5/232; G02B 7/38; G02B 7/36; G03B 13/36
   See application file for complete search history.

(56) References Cited

U.S. PATENT DOCUMENTS 4,735,494 A * 4/1988 Makino .................. G02B 7/282
                                                          348/347

FOREIGN PATENT DOCUMENTS

JP         2004-135029 A        4/2004

* cited by examiner

*Primary Examiner* — Yogesh K Aggarwal
(74) *Attorney, Agent, or Firm* — Renner Otto Boisselle & Sklar, LLP

(57) ABSTRACT

The image capture device includes an optical system including a focus lens, a CCD that captures a subject image input via the optical system and generates an image signal, an image processor that generates image data by performing predetermined processing on the image signal generated by the CCD, and a controller. The controller performs a scan operation for detecting a focus position for each of a plurality of partial regions of image data while moving the focus lens and records a moving image by moving the focus lens while switching a moving speed of the focus lens based on information on the focus position obtained for each of the plurality of partial regions as a result of the scan operation. The plurality of partial regions is a plurality of regions obtained by dividing an image region of the image data.

5 Claims, 18 Drawing Sheets

IN-FOCUS INFORMATION TABLE

| a | IN-FOCUS LENS POSITION WHICH IS CLOSEST TO NEAR SIDE (Pnear) | IN-FOCUS POSITION WHICH IS CLOSEST TO INFINITY SIDE (Pfar) |
|---|---|---|
| | 10 | 150 |

| | | REGION 1 | REGION 2 | REGION 3 | ... | REGION 30 | ... |
|---|---|---|---|---|---|---|---|
| b | IN-FOCUS FRAME NUMBER | 5 | 50 | 36 | ... | 50 | ... |
| c | IN-FOCUS FOCUS LENS POSITION | 10 | P | 75 | ... | P | ... |

42

IMAGE CAPTURE DEVICE

BACKGROUND

1. Technical Field

The present disclosure relates to an image capture device that makes it possible to shorten a period taken for a shooting operation in a case where a moving image is recorded by using a focus bracketing shooting function.

2. Description of the Related Art

As a function of a digital camera, a focus bracketing function of successively taking images while a focus position being shifted is known. This function allows a user to select an image having a desired in-focus state after taking the images.

Unexamined Japanese Patent Publication No. 2004-135029 discloses a digital camera having a focus bracketing function. This digital camera has a calculating unit and a controller. The calculating unit calculates in-focus evaluation values indicative of in-focus states of a plurality of images that has been sequentially taken by using the focus bracketing shooting function. The controller selects an image of a good in-focus state based on the in-focus evaluation values of the plurality of images calculated by the calculating unit and causes a recording unit to record, in a recording medium, image data of the selected image. In this way, it is possible to select and record an image of a good in-focus state from among a plurality of taken images.

SUMMARY

The present disclosure provides an image capture device that can shorten a period taken for a shooting operation so that a user does not miss a capturing opportunity in a case where a moving image is recorded by using a focus bracketing shooting function.

A first aspect of the present disclosure provides an image capture device. The image capture device includes an optical system including a focus lens, an image sensor that captures a subject image input via the optical system and generates an image signal, an image processor that generates image data by performing predetermined processing on the image signal generated by the image sensor, and a controller that controls the image sensor and the image processor. The controller performs a scan operation for detecting a focus position for each of a plurality of partial regions of the image data while moving the focus lens, and records a moving image by moving the focus lens while switching a moving speed of the focus lens based on information on the focus position obtained for each of the plurality of partial regions as a result of the scan operation. The plurality of partial regions is a plurality of regions obtained by dividing an image region of the image data.

DETAILED DESCRIPTION

Exemplary embodiments will be described in detail below with reference to the drawings as appropriate. However, descriptions in more detail than necessary may be omitted. For example, a detailed description of a matter which is already well-known and a repeated description for a substantially identical configuration may be omitted. This is intended to prevent the following description from becoming unnecessarily redundant and to facilitate understanding by those skilled in the art. Here, the inventor provides the attached drawings and the following description such that those skilled in the art can sufficiently understand the present disclosure, and therefore, they do not intend to restrict the subject matters of claims.

The exemplary embodiments of an image capture device of the present disclosure will be described below with reference to the drawings.

First Exemplary Embodiment

1. Configuration of Digital Camera

Figure 1:
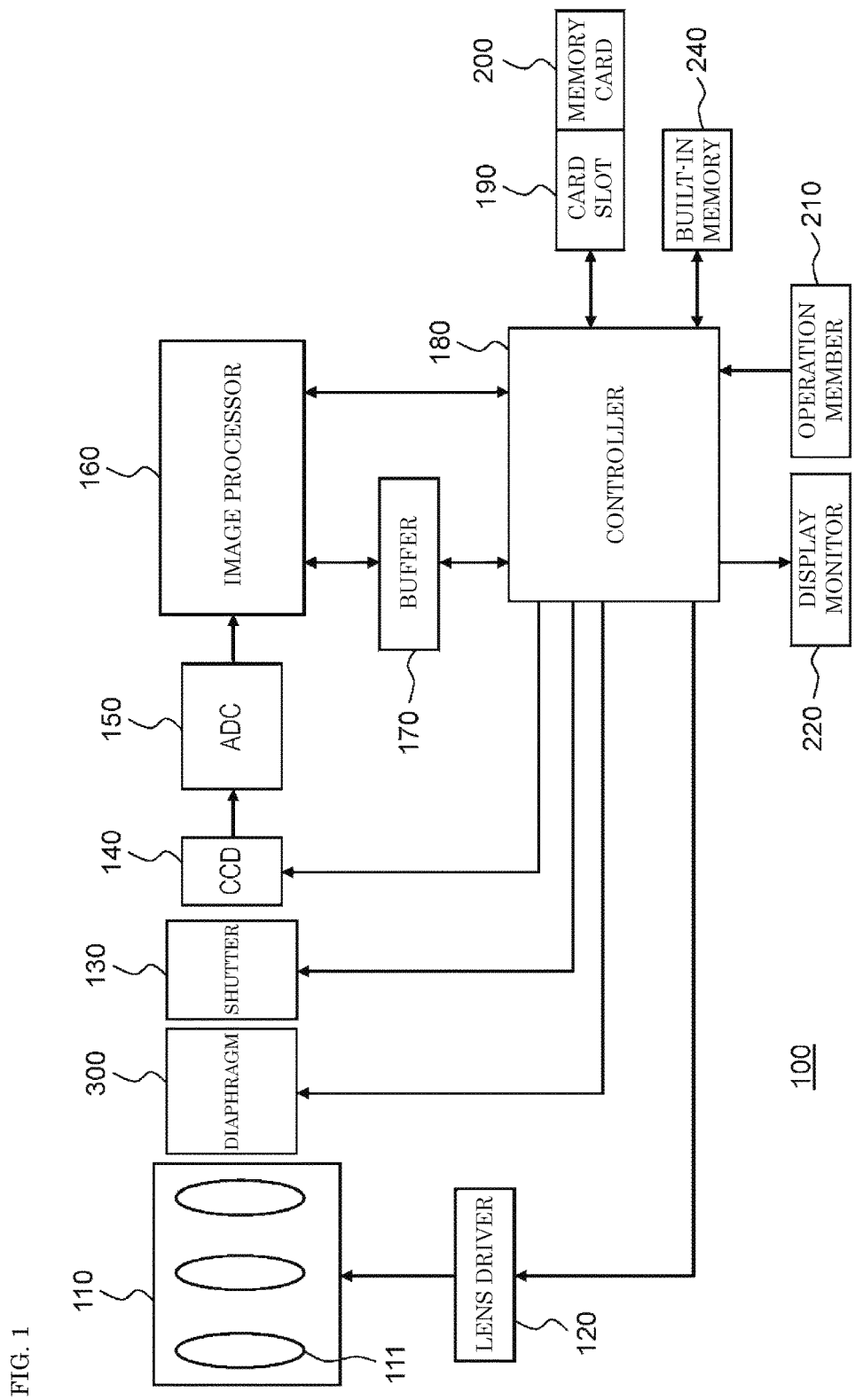
FIG. 1 is a view illustrating a configuration of a digital camera according to the present disclosure.

An example of an electrical configuration of a digital camera according to a first exemplary embodiment will be described with reference to FIG. 1. FIG. 1 is a block diagram illustrating a configuration of digital camera 100. Digital camera 100 is an image capture device that causes (charge-coupled device) CCD 140 to capture a subject image formed by optical system 110 made up of one or more lenses. Image data generated by CCD 140 is subjected to various types of processing by image processor 160 and is then stored in memory card 200. The configuration of digital camera 100 will be described in detail below.

Optical system 110 includes a zoom lens and focus lens 111. By moving the zoom lens along an optical axis, it is possible to enlarge or reduce the subject image. Furthermore, by moving focus lens 111 along the optical axis, it is possible to adjust a focus (in-focus state) on the subject image.

Lens driver 120 drives various kinds of lenses included in optical system 110. Lens driver 120 includes, for example, a zoom motor which drives the zoom lens and a focus motor which drives focus lens 111.

Diaphragm 300 adjusts a size of an aperture according to a user's setting or automatically and thereby adjusts an amount of light transmitting through the aperture.

Shutter 130 is means for shielding light to be transmitted to CCD 140. Shutter 130 constitutes an optical system unit that controls optical information indicating the subject image together with optical system 110 and diaphragm 300. Optical system 110 and diaphragm 300 are housed in a lens barrel (not illustrated).

CCD 140 captures the subject image formed by optical system 110 and thereby generates image data. CCD 140 includes a color filter, a light receiving element, and an auto gain controller (AGC). The light receiving element converts an optical signal of light collected by optical system 110 into an electrical signal and thereby generates image information. The AGC amplifies the electrical signal output from the light receiving element. CCD 140 further includes a driving circuit and the like that perform various kinds of operations such as exposure, transfer, and electronic shutter. This will be described later in detail.

Analog-digital converter (A/D converter: ADC) 150 converts analog image data generated by CCD 140 into digital image data.

Image processor 160 performs various types of processing on digital image data generated and converted by CCD 140 under control of controller 180. Image processor 160 generates image data to be displayed on display monitor 220 and generates image data to be stored in memory card 200. For example, image processor 160 performs various types of processing such as Gamma correction, white balance correction, and damage correction, on image data generated by CCD 140. Furthermore, image processor 160 compresses the image data generated by CCD 140 according to a compression format which complies with H.264 standards or MPEG2 standards. Image processor 160 can be realized, for example, by a digital signal processor (DSP) or a microcomputer. Furthermore, image processor 160 can generate, for example, image data (4K moving image data) of a moving image of approximately 4000×2000 pixels based on the image data generated by CCD 140. Image processor 160 can perform various types of processing that will be described later on the generated 4K moving image data.

Controller 180 is a control unit which controls entire digital camera 100. Image processor 160 and controller 180 can be realized, for example, by a semiconductor element. For example, image processor 160 and controller 180 can be realized, for example, by a microcomputer, a (central processing unit (CPU), a microprocessor unit (MPU), a digital signal processor (a DSP), an application-specific integrated circuit (ASIC), or a field-programmable gate array (FPGA). Image processor 160 and controller 180 may be realized by hardware only or may be realized by a combination of hardware and software.

Buffer 170 functions as a work memory of image processor 160 and controller 180. Buffer 170 can be realized by, for example, a dynamic random access memory (DRAM) or a ferroelectric memory.

Card slot 190 is a unit for attachment of memory card 200 to digital camera 100. Card slot 190 can mechanically and electrically connect memory card 200 and digital camera 100.

Memory card 200 includes a flash memory or a ferroelectric memory and can store data such as image files generated by image processor 160.

Built-in memory 240 is, for example, a flash memory or a ferroelectric memory. Built-in memory 240 stores a control program for controlling entire digital camera 100, data, and the like.

Operation member 210 is a generic term of a user interface which receives a user's operation. Operation member 210 includes, for example, a button, a lever, a dial, a touch panel, and a switch which receive a user's operation. Furthermore, operation member 210 includes a focus ring disposed on an outer circumference of the lens barrel. The focus ring is a member which is operated to rotate by the user to move focus lens 111.

Display monitor 220 can display an image (a through image) indicated by the image data generated by CCD 140 or an image indicated by image data read from memory card 200. Furthermore, display monitor 220 can display various menu screens for making various settings of digital camera 100. Display monitor 220 is realized by a liquid crystal display device or an organic EL display device.

Figure 2:
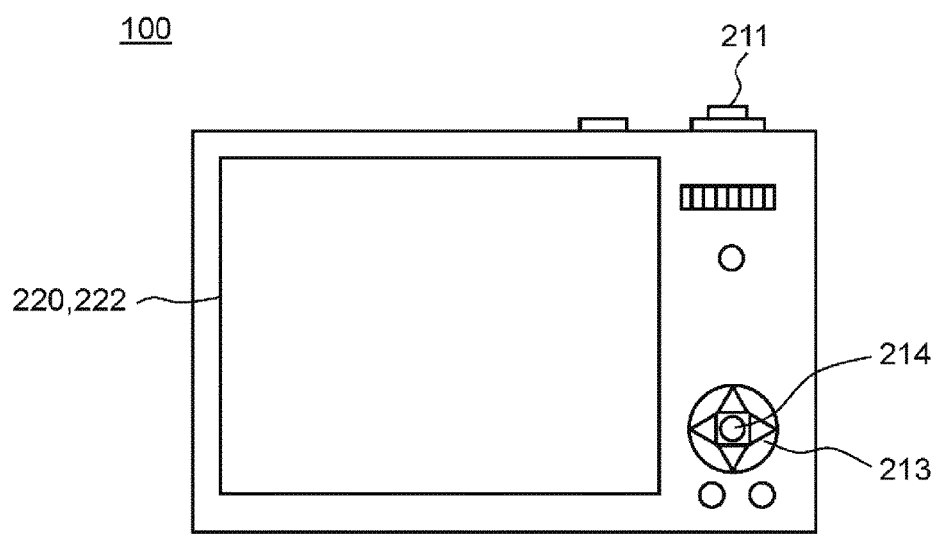
FIG. 2 is a back view of the digital camera.

FIG. 2 is a view illustrating a back surface of digital camera 100. FIG. 2 illustrates release button 211, selection buttons 213, determination button 214, and touch panel 222 as an example of operation member 210. Upon receipt of a user's operation, operation member 210 transmits various instruction signals to controller 180.

Release button 211 is a two-stage pressing type pressing button. When a user presses release button 211 halfway down, controller 180 executes, for example, autofocus control (AF control) and auto exposure control (AE control). When a user presses release button 211 fully down, controller 180 records image data imaged at a timing of the pressing operation as a recorded image in memory card 200. In a case where a user cancels pressing of release button 211 instead of fully pressing release button 211 after pressing release button 211 halfway down, the operation can be canceled.

Selection buttons 213 are upper, lower, left, and right pressing buttons. By pressing any one of upper, lower, left, and right selection buttons, the user can move a cursor or select various condition items displayed on display monitor 220.

Determination button 214 is a pressing button. When the user presses determination button 214 while digital camera 100 is in a shooting mode or a playback mode, controller 180 displays a menu screen on display monitor 220. The menu screen is a screen for setting various conditions for shooting and playback. When determination button 214 is pressed down while any of various condition setting items is being selected, controller 180 determines the setting of the selected item.

Touch panel 222 is overlaid on a display screen of display monitor 220 and detects a touch operation of a user's finger on a display screen. Thus, the user can perform, for example, an operation for designating a region on an image displayed on display monitor 220.

1.1 Focus Bracketing Function

Digital camera 100 according to the present exemplary embodiment has a focus bracketing function (also called a post focus function) of taking a moving image while changing a focus position and then selecting and recording a single frame from among images of a plurality of frames that constitute the taken moving image. This function allows a user to select a focus position after shooting. The user can set whether to turn on or off the focus bracketing function (whether to activate or deactivate the focus bracketing function), for example, on the menu.

The focus bracketing function is a function of taking a moving image while changing a focus position and then recording a single frame selected by a user from among images of a plurality of frames that constitute the taken image. In the focus bracketing function, for example, a 4K moving image having approximately 4000×2000 pixels is recorded. A still image is obtained by segmenting a single frame image selected based on user's designation from the 4K moving image thus recorded. The still image thus obtained is segmented from the 4K moving image and therefore has high image quality.

Figure 3A:
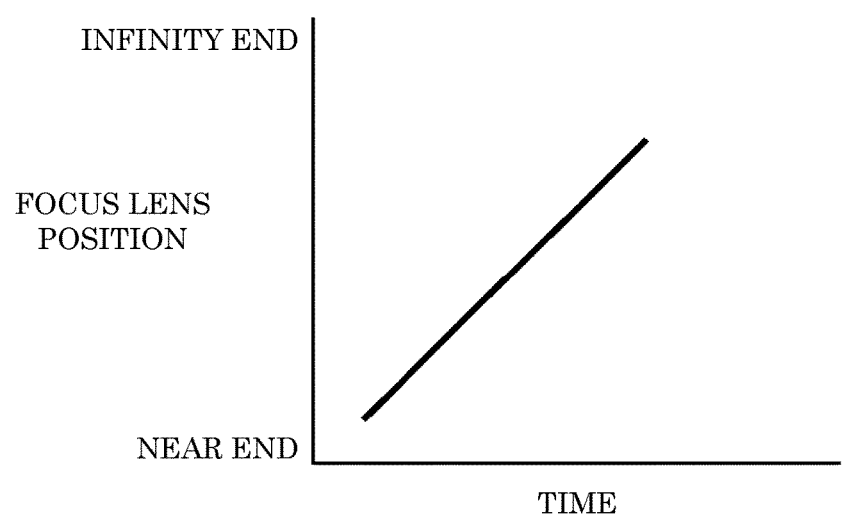
FIG. 3A is a view for describing movement of a focus lens in a bracketing operation.
Figure 3B:
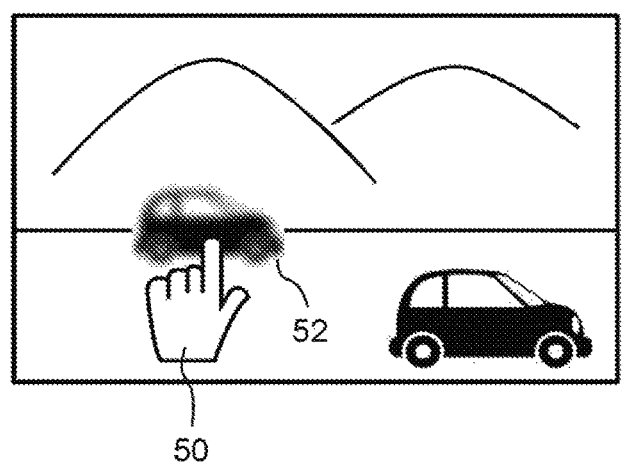
FIG. 3B is a view for describing user's designation of an in-focus region in an image.
Figure 4:
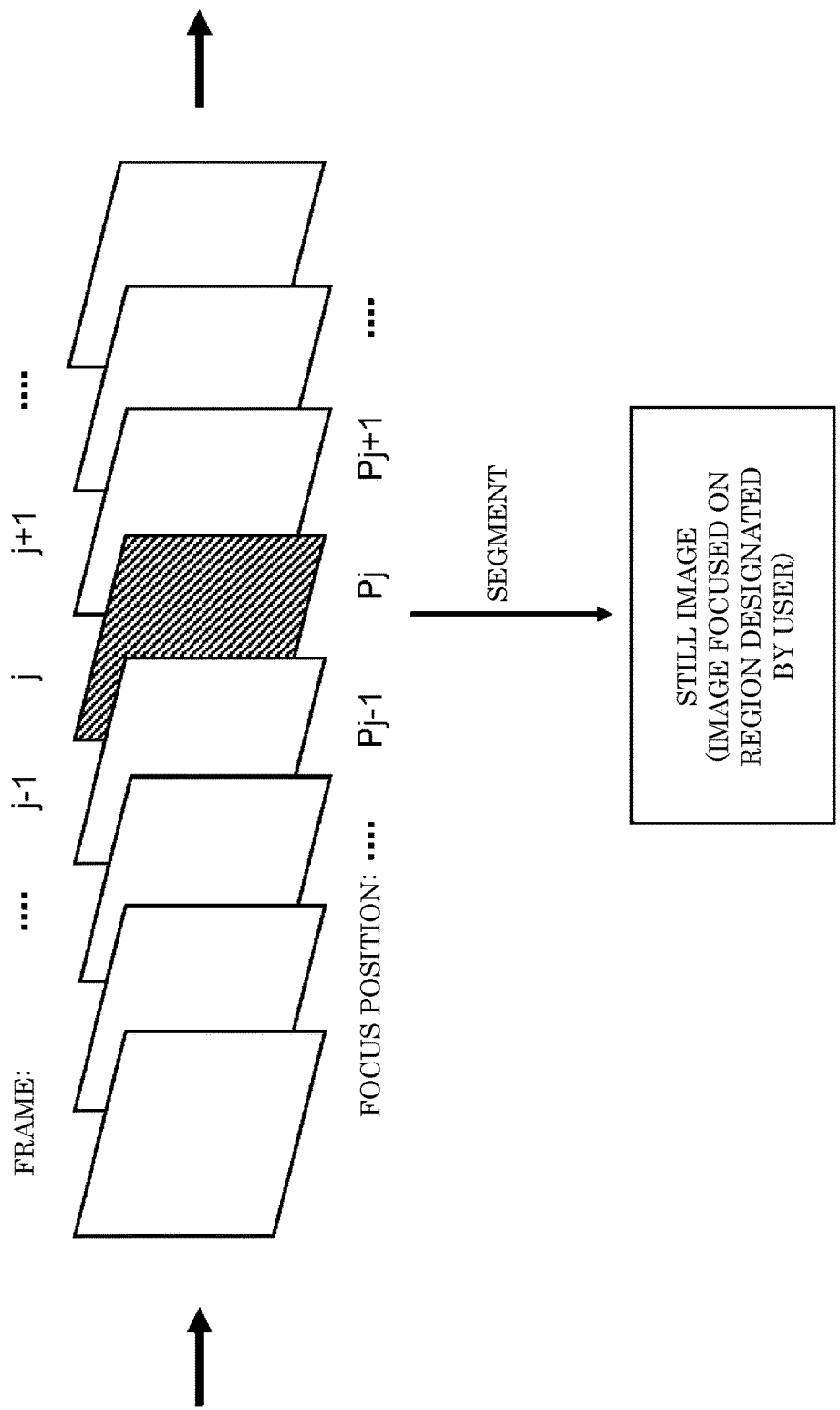
FIG. 4 is a view for describing a step of segmenting a still image from moving image data.

Specifically, in the focus bracketing function, a moving image is taken while focus lens 111 is being moved from a near side to an infinity side (or vice versa) as illustrated in FIG. 3A, i.e., while a focus position is being changed. Then, user 50 designates subject 52 (i.e., region) which user 50 wants to focus in the taken image, as illustrated in FIG. 3B. Digital camera 100 selects, based on user's designation, a single frame image from among a plurality of frame images that constitutes the moving image, and then segments and records the selected frame image as a still image, as illustrated in FIG. 4. This way makes it possible to obtain a high-quality still image focused on the subject (the region) designated by the user. Digital camera 100 according to the present exemplary embodiment sets a range in which focus lens 111 can be actually driven, to a range between a focus lens position (a near end) which is a near side limit and a focus lens position (an infinity end) which is an infinity side limit.

Figure 5:
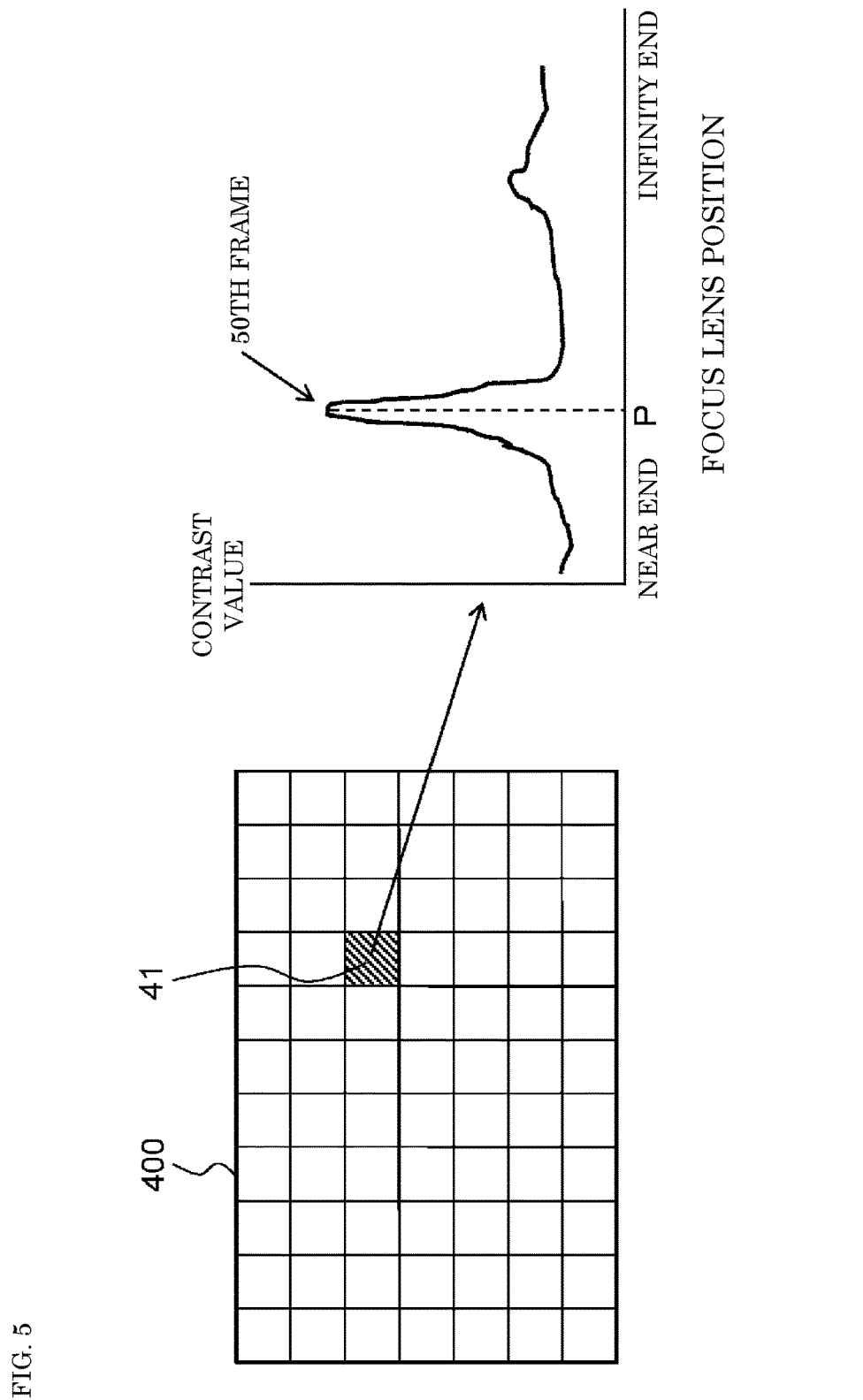
FIG. 5 is a view for describing an image divided into a plurality of regions.

For focus bracketing described above, digital camera 100 according to the present exemplary embodiment divides image region 400 into a plurality of regions as illustrated in FIG. 5 (or sets a plurality of regions in image region 400; the same applies hereinafter). For each of divided or set regions 41 (also referred to as AF regions), a frame focused on the region (hereinafter referred to as an "in-focus frame") is obtained from among a plurality of frames that constitutes a moving image, and information on the obtained in-focus frame is recorded in an in-focus information table. Before recording (shooting) a moving image in a focus bracketing operation, digital camera 100 performs a prescan operation (also called a focus search operation), and thereby detects an in-focus frame for each divided region and generates the in-focus information table. The plurality of regions obtained by dividing image region 400 is also referred to as a plurality of partial regions.

Figure 6A:
FIG. 6A is a view for describing an in-focus information table.
Figure 6B:
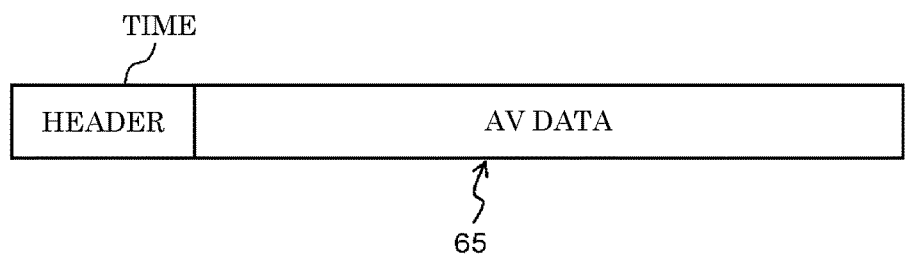
FIG. 6B is a view for describing a header of moving image data.

FIG. 6A is a view illustrating a data structure of the in-focus information table. In-focus information table 60 stores focus lens position (Pnear) at which a focus closest to the near side is obtained in the prescan operation, focus lens position (Pfar) at which a focus closest to the infinity side is obtained in the prescan operation, and a frame number of an in-focus frame for each divided region. Furthermore, in-focus information table 60 may store a position of focus lens 111 corresponding to the frame number of the in-focus frame (a focus lens position at which a focus is obtained is referred to as a "focus position"). In-focus information table 60 is stored in header 63 of moving image data 65 obtained by moving image shooting, as illustrated in FIG. 6B.

2. Focus Bracketing Operation

A focus bracketing operation (also called a post focus operation) of digital camera 100 having the above configuration is described below.

Figure 7:
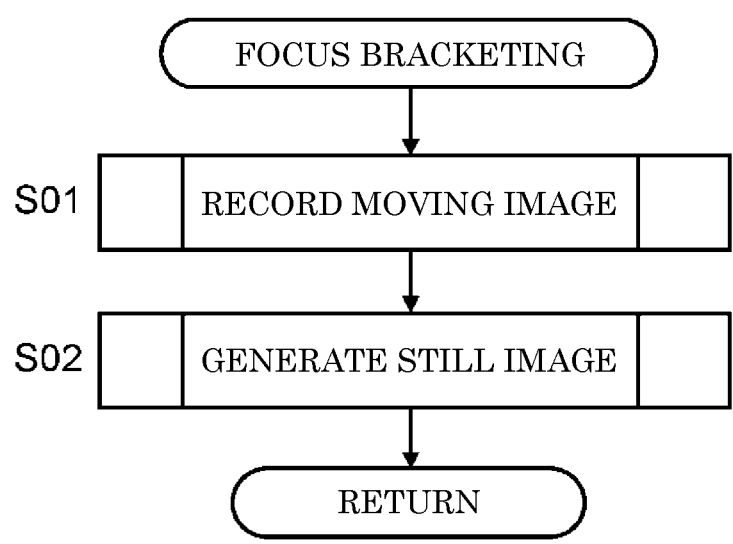
FIG. 7 is a flowchart illustrating a focus bracketing operation.

A moving image recording operation in the focus bracketing operation of digital camera 100 is described with reference to the flowchart of FIG. 7. The focus bracketing operation starts when a user presses release button 211 fully down in a state where the focus bracketing function is activated in advance in digital camera 100. The focus bracketing operation includes a moving image recording operation (S01) and a still image generating operation (S02). In the moving image recording operation, a moving image is recorded (shot) while focus lens 111 is being moved. In the still image generating operation, a still image that is focused on a subject (a region) designated by the user is generated from moving image data recorded in the moving image recording operation. Each of these operations will be described in detail below.

2.1 Moving Image Recording Operation

Figure 8:
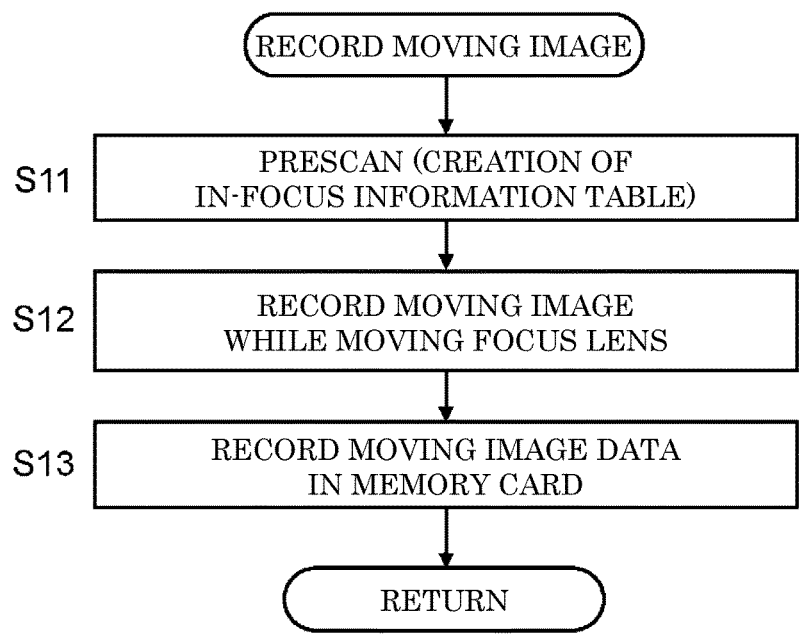
FIG. 8 is a flowchart illustrating a moving image recording operation in focus bracketing shooting.

FIG. 8 is a flowchart for describing the moving image recording operation (step S01). Controller 180 first performs a prescan operation for detecting a focus position for each of divided regions of an image and creating an in-focus information table (S11).

In the prescan operation, controller 180 detects a contrast value for each divided region of the image while moving focus lens 111 from the near end to the infinity end (or vice versa) (see FIG. 5). For example, controller 180 calculates a contrast value for each region (each AF region) 41 illustrated in FIG. 5 while moving focus lens 111.

Then, controller 180 creates in-focus information table 60 based on the result of prescan. Specifically, controller 180 obtains, as an in-focus frame, a frame having a maximum contrast value among a plurality of frame images obtained for each region by moving focus lens 111 from the near end to the infinity end. Then, controller 180 records a frame number indicative of the in-focus frame in in-focus information table 60. For example, when a peak of the contrast value is detected at focus lens position P in region (AF region) 41 illustrated in FIG. 5, a frame shot at focus lens position P (a 50th frame in this case) is an in-focus frame. Then, a frame number (50 in this example) of the in-focus frame is recorded in in-focus information table 60 (the frame number "50" of the in-focus frame on region 30 of FIG. 6A in this example). Furthermore, a position (P in this example) of focus lens 111 may be recorded in in-focus information table 60 ("P" in FIG. 6A, P=100 in this example). In-focus information table 60 is stored, for example, in a header of moving image data obtained by moving image shooting. When contrast values of all frames are lower than a predetermined threshold in one region, an in-focus frame (namely, a focus position) is not determined in this region. Therefore, a predetermined value indicating that a focus position is unknown is recorded in in-focus information table 60.

Controller 180 further obtains focus position (Pnear) of focus lens 111 closest to the near side and focus position (Pfar) of focus lens 111 closest to the infinity side from among focus positions obtained by moving focus lens 111 from the near end to the infinity end. Then, controller 180 records these values in in-focus information table 60. Focus position Pnear is a focus position corresponding to an in-focus frame closest to the near side, and focus position Pfar is a focus position corresponding to an in-focus frame closest to the infinity side.

Figure 9:
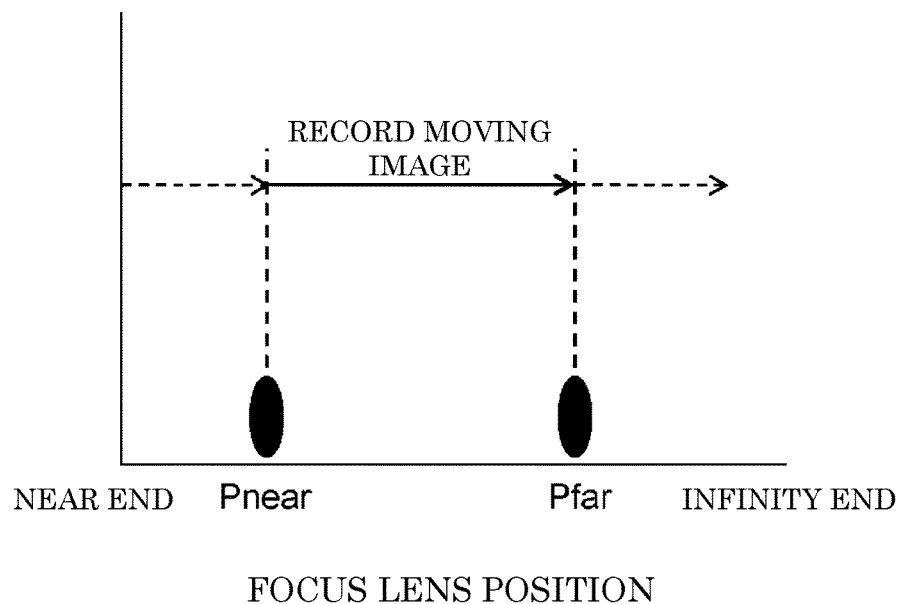
FIG. 9 is a view for describing a movement range of a focus lens in the focus bracketing shooting.

After finishing the prescan operation, controller 180 returns focus lens 111 to the near side and records a moving image while moving focus lens 111 within a predetermined range (S12). The predetermined range is a range from focus position (Pnear) of focus lens 111 closest to the near side to focus position (Pfar) of focus lens 111 closest to the infinity side, as illustrated in FIG. 9. By limiting a movement range of focus lens 111 to such a range, moving image recording is not performed in a range in which a focus is not obtained, and thus a period taken for moving image recording can be shortened. In the moving image recording, a moving image is recorded according to a predetermined format for moving image data. For example, the moving image is recorded according to MP4 standards (H.264/MPEG-4.AVC scheme).

When the moving image recording is finished, moving image data 65 in which in-focus information table 60 is recorded in header 63 is recorded in memory card 200 (S13), and thus the moving image recording operation is finished.

Figure 10:
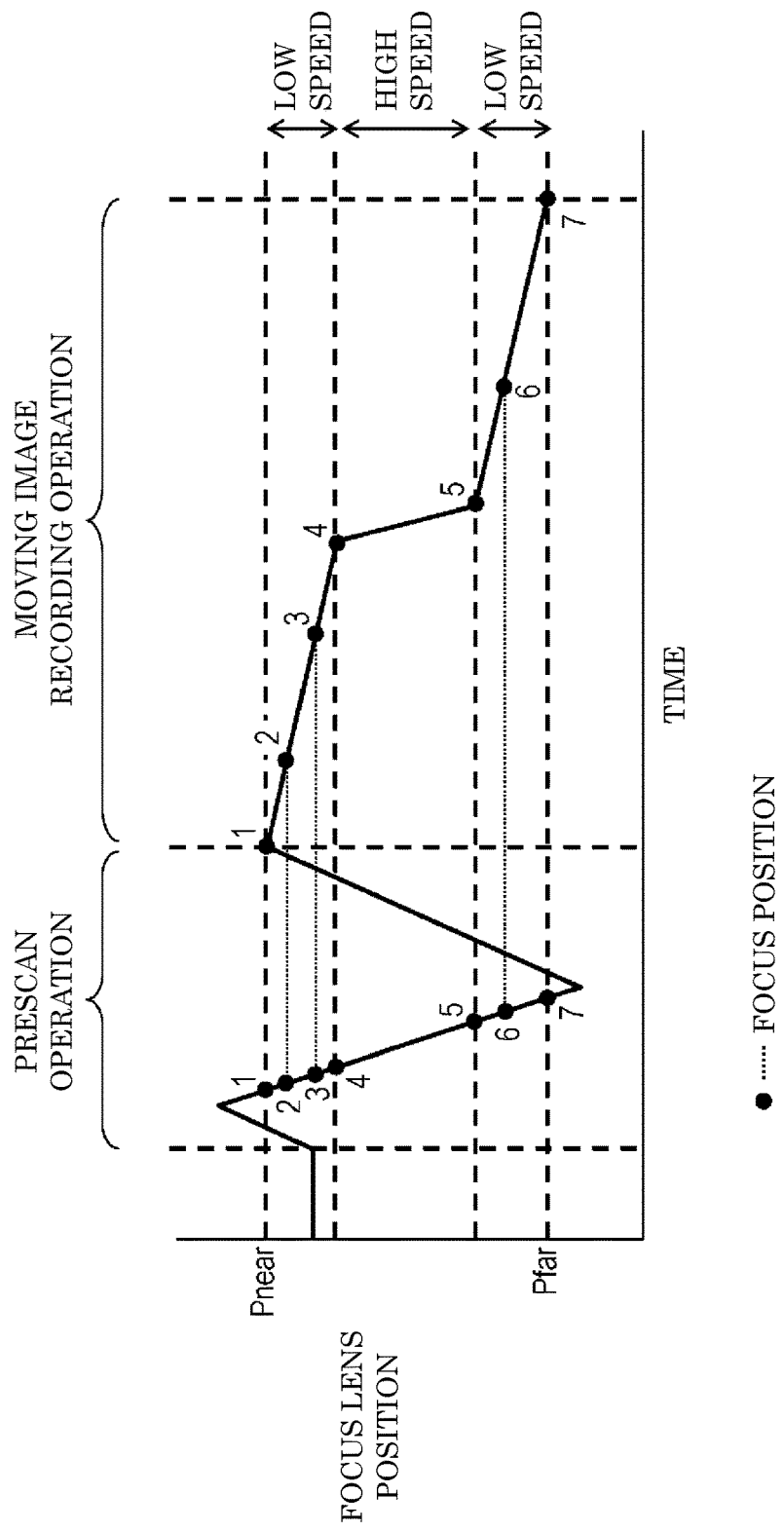
FIG. 10 is a view for describing switching of a moving speed of the focus lens.

FIG. 10 illustrates an operation of focus lens 111 during the focus bracketing operation, i.e., a temporal change of a focus lens position. In FIG. 10, the vertical axis represents a focus lens position, and the horizontal axis represents a time. By performing the prescan operation, a focus position for each region is detected except for a case where a focus position is unknown. FIG. 10 illustrates an example where seven focus positions have been detected. Specifically, FIG. 10 illustrates a case where there are seven focus lens positions (focus positions) at which a focus is obtained in any of the plurality of divided or set regions in image region 400. In FIG. 10, the detected focus positions are arranged in order from the near end to the infinity end is indicated by black circles 1 to 7 in FIG. 10. A focus position (a first focus position) indicated by black circle 1 is a focus position (Pnear) of focus lens 111 closest to the near side. A focus position (a seventh focus position) indicated by black circle 7 is a focus position (Pfar) of focus lens 111 closest to the infinity side.

During moving image shooting, focus lens 111 is moved in a range from focus position (Pnear) of focus lens 111 closest to the near side to focus position (Pfar) of focus lens 111 closest to the infinity side. In a case where it is determined that a distance between adjacent focus positions (i.e., a distance to a next focus position) is equal to or longer than a predetermined distance, focus lens 111 is moved at a first speed between the adjacent focus positions that are spaced away from each other by the predetermined distance or more during the moving image recording operation. In a case where a distance between adjacent focus positions is less than the predetermined distance, focus lens 111 is moved at a second speed slower than the first speed between the adjacent focus positions. In a case where a determination is made that only a distance between a fourth focus position and a fifth focus position among adjacent focus positions is equal to or longer than the predetermined distance (see FIG. 10), focus lens 111 is moved at the second speed between the first focus position and the fourth focus position and between the fifth focus position and a seventh focus position, and focus lens 111 is moved at the first speed faster than the second speed between the fourth focus position and the fifth focus position.

The first speed is determined by considering that an operation period of focus lens 111 during the moving image recording operation is made as short as possible. As the first speed, a highest speed achieved by an actuator of the lens may be designated. The second speed is determined by considering that importance is placed on image quality of a still image generated from the recorded moving image data. As the second speed, a lowest speed achieved by the actuator of the lens or a speed that allows movement per frame to fall within a depth of field may be designated. Assuming that a moving speed of focus lens 111 during the prescan operation is a third speed, the third speed is faster than the second speed and is slower than the first speed.

The predetermined distance is determined in consideration of an amount of movement per frame in a case where the second speed is designated. In a case where there is a possibility that n frames before and after a focus position be generated as a still image, a value larger than 2n times and smaller than 2(n+1) times the amount of movement per frame in a case where the second speed is designated may be designated as the predetermined distance. By selecting the predetermined distance as described above, a period taken for moving image recording can be shortened.

2.2 Generation of Still Image from Moving Image Data

Figure 11:
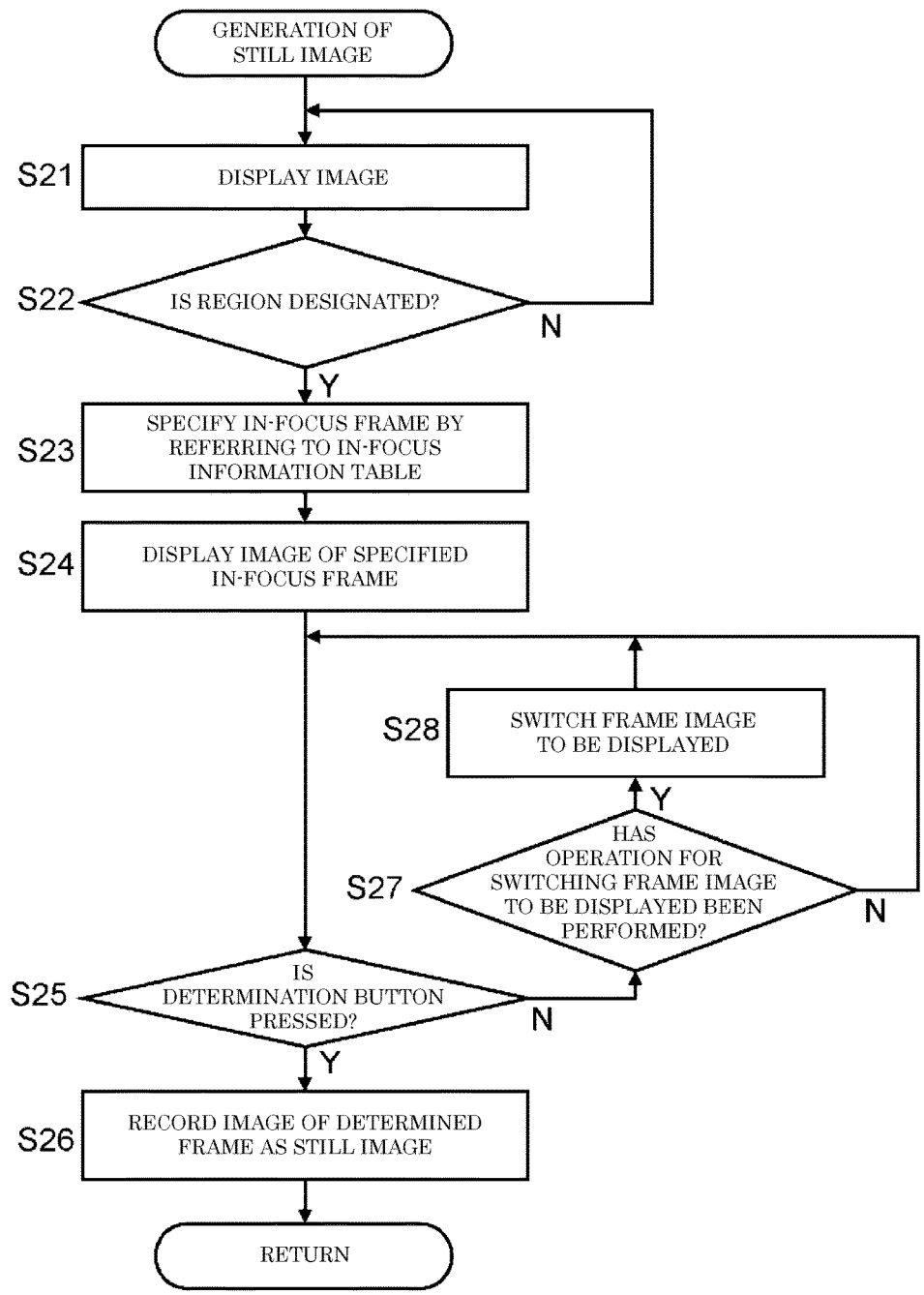
FIG. 11 is a flowchart illustrating processing for generating a still image from moving image data.

The still image generating operation (step S02) is described below with reference to the flowchart of FIG. 11. In the still image generating operation, a still image that is focused on a subject (a region) designated by a user is generated from a moving image shot in the moving image recording operation.

Figure 12:
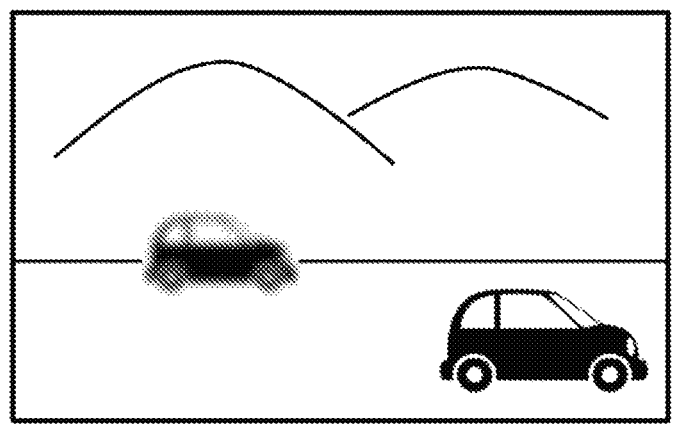
FIG. 12 is a view illustrating a screen displayed after recording of moving image data.

Controller 180 causes a moving image recorded last time to be displayed on display monitor 220 (S21). For example, the moving image recorded last time is displayed on display monitor 220 as illustrated in FIG. 12. In this step, one (still image) of a plurality of frame images that constitutes the recorded moving image may be displayed.

Figure 13A:
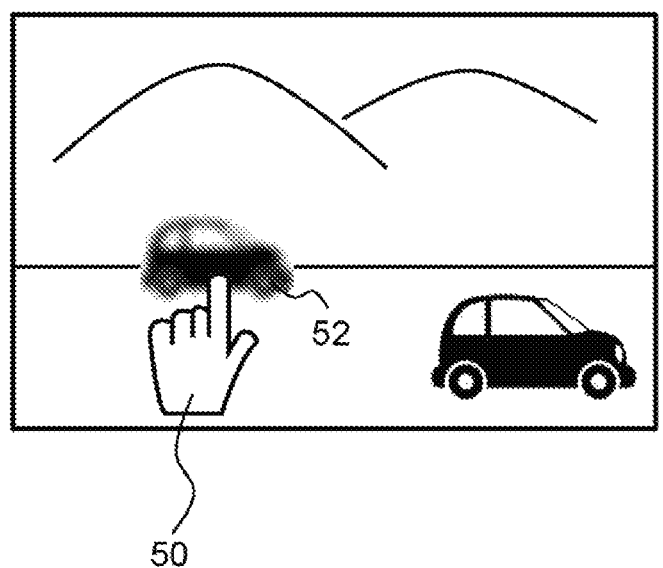
FIG. 13A is a view for describing a user's operation for designating a desired subject.

A user designates a subject (i.e., a region) which the user wants to focus on the displayed image by operating touch panel 222 provided on a back face of the camera. For example, user 50 designates subject 52 as a target (a region) which user 52 wants to focus on by touching subject 52, as illustrated in FIG. 13A.

Figure 13B:
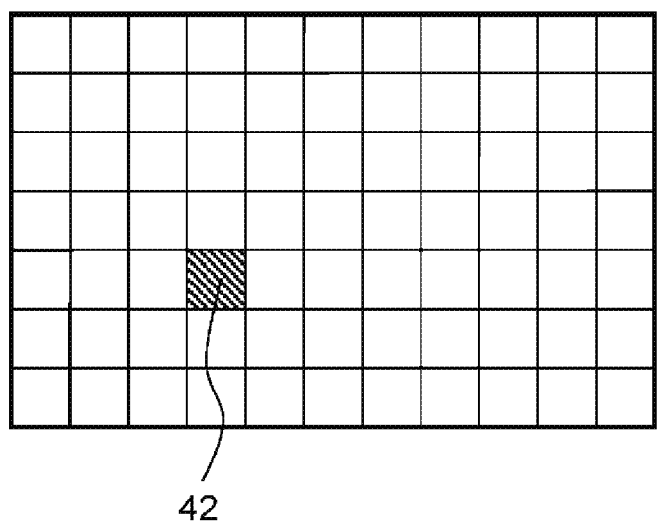
FIG. 13B is a view illustrating a region corresponding to the subject designated by the user.

When a subject (i.e., a region) is designated by a user (YES in S22), controller 180 specifies an in-focus frame for the region designated by the user by referring to in-focus information table 60 (S23). For example, in a case where subject 52 is designated by the user as illustrated in FIG. 13A, controller 180 specifies region 42 corresponding to subject 52 and obtains a frame number of an in-focus frame for region 42 by referring to in-focus information table 60 as illustrated in FIG. 13B.

Figure 14A:
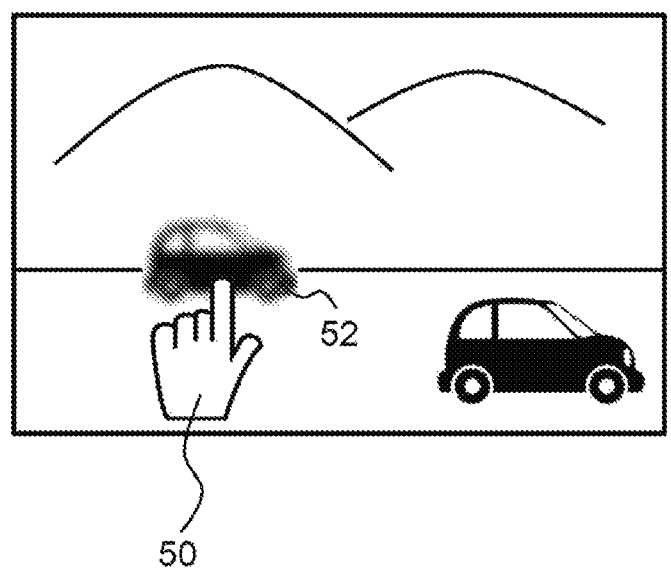
FIG. 14A is a view for describing a user's operation for designating a desired subject.
Figure 14B:
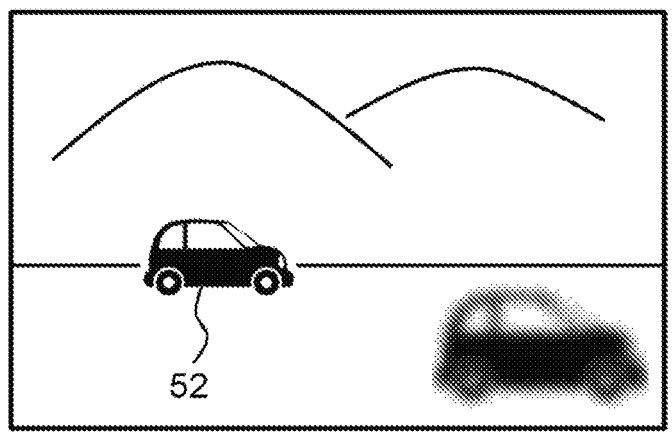
FIG. 14B is a view illustrating an example of how an image focused on the subject designated by the user is displayed.

Then, controller 180 causes a frame image of the specified frame number to be displayed on display monitor 220 (S24). For example, in a case where subject 52 is designated by user 50 on an image illustrated in FIG. 14A, an image focused on designated subject 52 is displayed as illustrated in FIG. 14B.

In a case where the image displayed on display monitor 220 is a desired one, the user can determine the image as a still image to be recorded by pressing determination button 214. Meanwhile, in a case where the image displayed on display monitor 220 is not a desired one, the user can switch the image displayed on display monitor 220 to a frame image that is temporally before and after the image displayed on display monitor 220 by operating selection button 213.

When the operation of switching the image is performed by the user (S27), controller 180 switches the image displayed on display monitor 220 in accordance with the operation (S28). The user can cause a desired image to be displayed on display monitor 220 by performing the switching operation as appropriate.

When the user presses determination button 214 (S25), the displayed image (frame image) is segmented as a still image and is recorded in memory card 200 (S26). For example, when determination button 214 is pressed, a confirmation message for the user may be displayed on display monitor 220. In a case where a user's instruction ("YES") is input in response to the confirmation message, controller 180 may extract data of the displayed frame image from the moving image data and record the extracted data as a still image in memory card 200. The still image data may be recorded in built-in memory 240 or another recording medium instead of or in addition to memory card 200.

The moving image data is recorded according to a codec for moving images (e.g., H.264 or 11.265) and is subjected to inter-frame compression. Accordingly, when a frame of the moving image data is segmented as a still image, controller 180 records data of the frame image after conversion into a format (e.g., JPEG) for a still image.

In this way, still image data focused on a region designated by the user can be segmented from moving image data. That is, the user can obtain an image focused on a desired subject.

3. Effects and Other Remarks

Digital camera 100 according to the present exemplary embodiment includes optical system 110 including focus lens 111, CCD 140 (an example of an image sensor) that captures a subject image input via optical system 110 and generates an image signal, image processor 160 that generates image data by performing predetermined processing on the image signal generated by CCD 140, and controller 180 (an example of a controller) that controls CCD 140 and image processor 160. Controller 180 performs a scan operation for detecting a focus position for each of a plurality of partial regions of image data while moving focus lens 111 and then records a moving image by moving focus lens 111 while switching a moving speed of focus lens 111 based on information on the focus position obtained for each of the plurality of partial regions as a result of the scan operation. The plurality of partial regions is a plurality of regions obtained by dividing an image region of the image data.

Controller 180 records a moving image by moving focus lens 111 between a focus position closest to the near end and a focus position closest to the infinity end and by moving focus lens 111 at a higher speed between adjacent focus positions that are spaced away from each other by a predetermined distance than a speed between adjacent focus positions that are spaced away from each other by less than the predetermined distance. Digital camera 100 further includes operation member 210 operated by a user, and operation member 210 receives user's designation of a region on the image. Controller 180 extracts a frame image (an in-focus frame) that is focused on a region designated by the user from among a plurality of frame images that constitutes recorded moving image data and generates a still image. Controller 180 causes the still image to be recorded in memory card 200 (an example of a predetermined recording medium).

As described above, digital camera 100 according to the present exemplary embodiment extracts a frame image (an in-focus frame) focused on a region designated by the user from moving image data captured while changing a focus position and records the extracted frame image as a still image. This allows the user to easily obtain a still image focused on a desired image region (a subject) by touching and thereby designating a region of an image. Since the still image is generated from a moving image shot while successively changing a focus position, an image focused on any subject included in an angle of view of the moving image can be obtained. Furthermore, since a moving image is recorded by moving a focus lens while switching a moving speed of the focus lens, it is possible to provide an image capture device that can shorten a period taken for a shooting operation so that a user does not miss a shooting opportunity.

Other Exemplary Embodiments

As described, the first exemplary embodiment has been described to exemplify a technique disclosed in the present application. However, the technique in the present disclosure is not limited to this, and can also be applied to an exemplary embodiment in which modification, replacement, addition, omission, or the like is performed appropriately. In addition, a new exemplary embodiment can be made by combining constituents described in the above first exemplary embodiment with other constituents. Therefore, other exemplary embodiments will be described below.

(1) In the above exemplary embodiment, in a focus bracketing operation, in-focus information table 60 is created by performing a prescan operation before recording a moving image. Since boundary focus positions between which a focus is obtained can be recognized by the prescan operation, an effective range in which the focus lens is moved during moving image recording can be set. This is advantageous in that a moving image can be efficiently recorded. However, the prescan operation is not essential, and in-focus information table 60 may be created concurrently with moving image recording. This method is advantageous in that an angle of view during moving image recording and an angle of view during focus information generation are same as each other.

(2) In the above exemplary embodiment, in-focus information table 60 stores a focus position (Pnear) closest to the near side and a focus position (Pfar) closest to the infinity side. However, these focus positions (Pnear and Pfar) need not necessarily be stored in in-focus information table 60 and instead may be held independently from in-focus information table 60.

(3) In the above exemplary embodiment, in-focus information table 60 stores, for each region of an image, information (frame number) indicative of a frame (in-focus frame) focused on the region. However, the configuration of in-focus information table 60 is not limited to this. In-focus information table 60 may store, for each region of an image, a position of focus lens 111 at which the region is in focus. In this case, a second table indicative of a relationship between a focus lens position and each frame during moving image recording may be created. When a still image is segmented, a frame image cut out from the moving image can be specified by referring to in-focus information table 60 and the second table.

(4) In the above exemplary embodiment, contrast AF is used as an autofocus method. Alternatively, phase difference AF may be used.

(5) The focus bracketing function disclosed in the above exemplary embodiment is applicable to both of digital cameras with interchangeable lenses and digital cameras with built-in lenses.

(6) In the above exemplary embodiment, a digital camera is used as an example of the image capture device. However, the image capture device is not limited to this. The idea of the present disclosure is applicable to various imaging devices such as digital video cameras, smartphones, and wearable cameras which can shoot moving images.

(7) In the above exemplary embodiment, an imaging element is configured as a CCD, yet the imaging element is not limited to this. The imaging element may be a nonvolatile metal oxide semiconductor (NMOS) image sensor or may be a complementary metal-oxide semiconductor (CMOS) image sensor.

As described above, the exemplary embodiments have been described to exemplify the technique disclosed in the present disclosure. For this reason, accompanying drawings and detailed description are provided. Therefore, the components described in the accompanying drawings and the detailed description include not only the components essential for solving the problem but also components that are not essential for solving the problem in order to illustrate the techniques. For this reason, even if these unessential components are described in the accompanying drawings and the detailed description, these unessential components should not be immediately approved as being essential. Further, since the above exemplary embodiments illustrate the technique in the present disclosure, various modifications, substitutions, additions and omissions can be performed within the scope of claims and equivalent scope of claims.

The present disclosure is applicable to an image capture device which can capture moving images. Specifically, the present disclosure is applicable to various image capture devices such as digital video cameras, smartphones, and wearable cameras which can shoot moving images.

What is claimed is:

1. An image capture device comprising:
an optical system including a focus lens;
an image sensor that captures a subject image input via the optical system and generates an image signal;
an image processor that generates image data by performing predetermined processing on the image signal generated by the imaging unit; and
a controller that controls the image sensor and the image processor,
wherein
the controller performs a scan operation for detecting a focus position for each of a plurality of partial regions of the image data while moving the focus lens and records a moving image by moving the focus lens while switching a moving speed of the focus lens based on information on the focus position obtained for each of the plurality of partial regions as a result of the scan operation,
the plurality of partial regions is a plurality of regions obtained by dividing an image region of the image data, and
the controller moves the focus lens between a focus position closest to a near end and a focus position closest to an infinity end and records the moving image while moving the focus lens at a higher speed between adjacent focus positions that are spaced away from each other by a predetermined distance than a speed between adjacent focus positions that are spaced away from each other by less than the predetermined distance.

2. The image capture device according to claim 1, further comprising
an operation unit operated by a user,
wherein
the operation unit receives user's designation of a region on the image, and
the controller extracts a frame image focused on the region designated by the user from among a plurality of frame images that constitutes the recorded moving image and generates a still image.

3. The image capture device according to claim 2, wherein the controller records the still image in a predetermined recording medium.

4. An image capture device comprising:
an optical system including a focus lens;
an image sensor that captures a subject image input via the optical system and generates an image signal;
an image processor that generates image data by performing predetermined processing on the image signal generated by the imaging unit; and
a controller that controls the image sensor and the image processor,
wherein
the controller performs a scan operation for detecting a focus position for each of a plurality of partial regions of the image data while moving the focus lens and records a moving image by moving the focus lens while switching a moving speed of the focus lens based on information on the focus position obtained for each of the plurality of partial regions as a result of the scan operation, and
the plurality of partial regions is a plurality of regions obtained by dividing an image region of the image data, and
further comprising
an operation unit operated by a user,
wherein
the operation unit receives user's designation of a region on the image, and
the controller extracts a frame image focused on the region designated by the user from among a plurality of frame images that constitutes the recorded moving image and generates a still image.

5. The image capture device according to claim 4, wherein the controller records the still image in a predetermined recording medium.

* * * * *